United States Patent
Nishimura et al.

(10) Patent No.: US 7,746,740 B2
(45) Date of Patent: Jun. 29, 2010

(54) RECORDING CONTROL METHOD FOR OPTICAL DISK RECORDING APPARATUS AND OPTICAL DISK RECORDING APPARATUS

(75) Inventors: Koichiro Nishimura, Yokohama (JP); Tsuyoshi Toda, Kodaira (JP); Atsushi Yamada, Saitama (JP); Toru Kawashima, Mito (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 700 days.

(21) Appl. No.: 11/496,637

(22) Filed: Aug. 1, 2006

(65) Prior Publication Data

US 2007/0121451 A1 May 31, 2007

(30) Foreign Application Priority Data

Nov. 25, 2005 (JP) .............................. 2005-339811

(51) Int. Cl.
G11B 7/00 (2006.01)
(52) U.S. Cl. ............... 369/47.53; 369/53.31; 369/53.44
(58) Field of Classification Search .............. 369/47.52, 369/47.53, 53.31, 53.44
See application file for complete search history.

(56) References Cited

U.S. PATENT DOCUMENTS

| | | | |
|---|---|---|---|
| 6,636,468 B2 * | 10/2003 | Salmonsen et al. ........ | 369/47.53 |
| 6,980,497 B2 * | 12/2005 | Tsukihashi et al. ........ | 369/44.38 |
| 7,313,064 B2 * | 12/2007 | Kim ........................ | 369/47.53 |
| 2002/0044507 A1 * | 4/2002 | Hagiwara et al. .......... | 369/47.4 |
| 2004/0076094 A1 * | 4/2004 | Toshiaki et al. .......... | 369/47.53 |
| 2005/0105459 A1 * | 5/2005 | Tamura et al. ........... | 369/275.4 |

FOREIGN PATENT DOCUMENTS

| | | |
|---|---|---|
| JP | 2003-016652 | 1/2003 |
| JP | 2003-67935 | 3/2003 |
| JP | 2003-115110 | 4/2003 |
| JP | 2003-141732 | 5/2003 |
| JP | 2004-30893 | 1/2004 |
| JP | 2004-062945 | 2/2004 |
| JP | 2004-288337 | 10/2004 |
| JP | 2004-319023 | 11/2004 |
| JP | 2005-129166 | 5/2005 |

OTHER PUBLICATIONS

Office Action issued in Japanese Patent Application No. 2005-339811 on Feb. 12, 2010.

* cited by examiner

Primary Examiner—Wayne R Young
Assistant Examiner—LaTanya Bibbins
(74) Attorney, Agent, or Firm—Antonelli, Terry, Stout & Kraus, LLP.

(57) ABSTRACT

In the present invention, the processing sequence of a microprocessor for restructuring the recording parameters when changing the recording in an optical disk recording apparatus from a constant angular velocity (CAV) mode to a constant linear velocity (CLV) mode is as follows: (1) interrupt the recording process; (2) calculate a linear velocity at a point where the recording linear velocity becomes constant; (3) calculate a third recording parameter in the linear velocity by a linear interpolation based on first and second recording parameters which are corrected by test writing, replacing all the recording parameters for an outer circumference of an optical disk from a radius position where the linear velocity becomes Cx, with the third recording parameter; and (4) restart the recording with the third recording parameter as a recording condition.

17 Claims, 4 Drawing Sheets

FIG. 5

| RBP | ITEM | INNERMOST CIRCUMFERENCE | OUTERMOST CIRCUMFERENCE |
|---|---|---|---|
| 0 | LINEAR VELOCITY | $V_6 \times 10$ (m/s) | $V_{16} \times 10$ (m/s) |
| 1 | RECORDING POWER | $P_6 \times 0.1$ (mW) | $P_{16} \times 0.1$ (mW) |
| 2 | PULSE EDGE POSITION INFORMATION (FRONT EDGE) | $Twf_6$ | $Twf_{16}$ |
| 3 | PULSE EDGE POSITION INFORMATION (REAR EDGE) | $Twe_6$ | $Twe_{16}$ |

FIG. 6

| RBP | ITEM | INNERMOST CIRCUMFERENCE | BROKEN POINT | OUTERMOST CIRCUMFERENCE |
|---|---|---|---|---|
| 0 | LINEAR VELOCITY | $V_6 \times 10$ (m/s) | $Vc \times 10$ (m/s) | $Vc \times 10$ (m/s) |
| 1 | RECORDING POWER | $P_6 \times 0.1$ (mW) | $Pc \times 0.1$ (mW) | $Pc \times 0.1$ (mW) |
| 2 | PULSE EDGE POSITION INFORMATION (FRONT EDGE) | $Twf_6$ | $Twfc$ | $Twfc$ |
| 3 | PULSE EDGE POSITION INFORMATION (REAR EDGE) | $Twe_6$ | $Twec$ | $Twec$ |

RECORDING CONTROL METHOD FOR OPTICAL DISK RECORDING APPARATUS AND OPTICAL DISK RECORDING APPARATUS

BACKGROUND OF THE INVENTION

1. Field of the Invention

The present invention relates to an optical disk recording apparatus, and more particularly to a recording control method for an optical disk recording apparatus capable of quickly dealing with a change in the recording system.

2. Description of the Related Art

The optical disk recording apparatus is an apparatus for recording information on an optical disk using a laser beam. Examples of the optical disk recording apparatus that are currently marketed include rewritable ones such as DVD-RAM, DVD-RW and CD-RW, as well as recordable ones such as DVD-R and CD-R. Examples of the disk recording system include a CAV (Constant Angular Velocity) system that controls the disk rotation speed to be constant, a CLV (Constant Linear Velocity) system that controls the recording linear velocity to be constant, and a PCAV (Partial Constant Angular Velocity) that uses both the CAV system and the CLV system together.

The CAV system is not necessary to change the disk rotation speed when seeking and capable of providing high-speed access. However, because the linear velocity becomes higher as it approaches the outer circumference of the disk, there is a disadvantage that the lower power is insufficient and the recording quality degrades. The CLV system controls the disk rotation so that the linear velocity is kept constant, which makes it possible to realize the maximum recording capacity without any waste occurring in the recording area. Meanwhile, the rotation speed substantially increases when recording on the inner circumference of the disk, so that the apparatus vibrates and the recording quality degrades. In the worst case, the disk could be damaged due to centrifugal force. The PCAV system is a system that employs the CAV system (i.e., CAV mode of operation) as long as the linear velocity does not exceed the maximum linear velocity from the inner circumference of the optical disk toward the outer circumference thereof, and that switches from the CAV mode to the CLV system (i.e., CLV mode of operation) when the linear velocity exceeds the maximum linear velocity at the outer circumference of the optical disk in order to realize high-speed access and large recording capacity.

In Japanese Patent Publication Laid-Open No. 2003-141732 there is described a control method in a PCAV system to monitor the recording state in real time and switch the rotation system at a time when the recording state deteriorates, from the CAV mode to the CLV mode regardless of the laser capability.

SUMMARY OF THE INVENTION

In the above described JP-A-2003-141732, there is a description that a servo circuit is controlled so as to keep the linear velocity immediately before switching, when the rotation system of the disk is switched from the CAV mode to the CLV mode in the case where the linear velocity exceeds the maximum linear velocity after the start of recording. However, there is no description on restructuring of the recording parameters such as recording power and recording pulse width. Furthermore, there is also no description on the linear velocity, recording power and a recording pulse width for switching from the CAV mode to the CLV mode upon detecting that the recording state has deteriorated. Generally, in the event of a change in the rotation speed of the optical disk during recording in the CAV mode, it is necessary to perform again learning of a group of recording parameters at a plurality of radius positions to restructure the recording parameters. However, it is also necessary to interrupt the recording process until the recording parameters are restructured, and a prolonged interruption time until the resumption of recording has a significantly negative impact on the characteristics of the optical disk recording apparatus. Thus, it is an important to solve the problem of how to shorten the record interruption time when switching from the CAV mode to the CLV mode of operation.

It is an object of the present invention to reduce the interruption time until the resumption of recording, in the event of a change in the rotation speed of an optical disk during recording in the CAV mode, by quickly derive the recording parameter corresponding to the rotation speed after the change.

In order to achieve the above object, a recording control method for an optical disk recording apparatus according to an embodiment of the invention includes the steps of:

reproducing control data from a control data area of the optical disk, and extracting recording parameters from the control data to create a recording parameter table;

performing test writing at two or more radius positions of the optical disk to correct the recording parameters in the recording parameter table;

performing recording, in a CAV mode, from an inner circumference of the optical disk toward an outer circumference thereof based on the corrected recording parameters;

interrupting the recording process when a change to a CLV mode occurs during recording in the CAV mode, and calculating linear velocity at the point of the change;

calculating the recording parameter in the calculated linear velocity based on the corrected recording parameters;

replacing the corrected recording parameters for the outer circumference side from a radius position at the point of the change, with the calculated recording parameter; and restarting recording based on the replaced recording parameter.

Further, in order to achieve the above object, an optical disk recording apparatus according to an embodiment of the present invention has:

a spindle motor for rotating an inserted optical disk;

an optical head for recording data by irradiating a laser beam onto the optical disk, detecting reflected light from the optical disk, and outputting a servo signal and a reproduction signal;

a servo circuit for inputting the servo signal from the optical head to control a position of the optical head;

a signal reproduction block for inputting the reproduction signal and outputting demodulated data and an address signal; and a microprocessor for inputting the outputs of the signal reproduction block to control the respective sections described above, under the control of the microprocessor, the optical disk recording apparatus reproducing the control data from the control data area of the optical disk to create a recording parameter table, performing test writing at two or more radius positions of the optical disk to correct the recording parameters in the recording parameter table, performing recording in the CAV mode from an inner circumference of the optical disk toward an outer circumference thereof based on the corrected recording parameters, interrupting the recording process when a change from the CAV mode to the CLV mode occurs during recording to calculate a linear velocity at the point of the change, calculating the recording parameter at the calculated linear velocity based on the corrected recording parameters, replacing the corrected recording parameters for the outer circumference of the optical disk from the radius position at the point of the change with the calculated recording parameter, and then restarting recording based on the replaced recording parameter.

According to the invention, even in the event of a change in the rotation speed of the optical disk during recording in the CAV mode, it is possible to quickly derive the recording parameter corresponding to the rotation speed after the change, so that the interruption time until the resumption of recording can be reduced.

BRIEF DESCRIPTION OF THE DRAWINGS

FIG. 5 is a block diagram of a recording parameter table corrected by performing test writing;

FIG. 6 is a block diagram of a restructured recording parameter table according to an embodiment of the invention.

DESCRIPTION OF THE PREFERRED EMBODIMENTS

Figure 3:
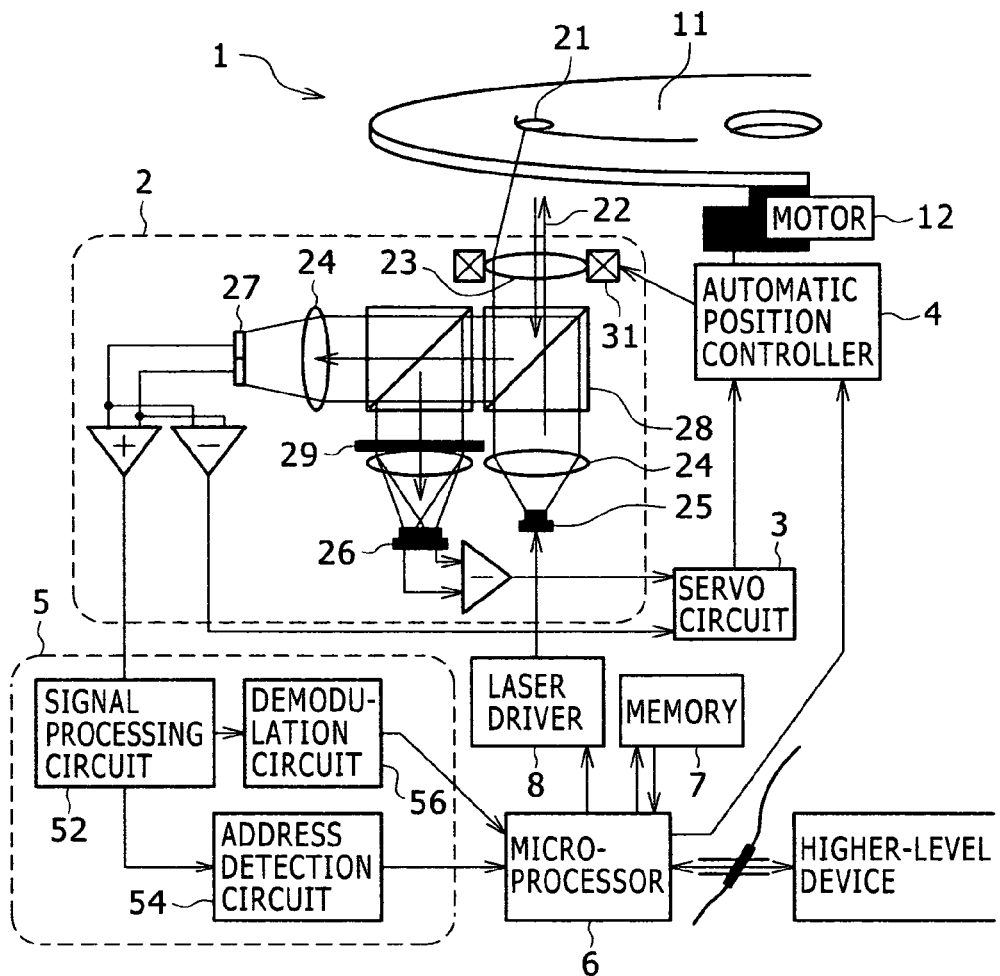
FIG. 3 is a schematic block diagram of an optical disk recording apparatus to which the recording control method according to an embodiment of the invention is applied.

The general configuration of an optical disk recording apparatus will be described with reference to FIG. 3. An optical disk recording apparatus 1 has a spindle motor (motor) 12, where an optical disk 11 loaded to a rotary shaft of the spindle motor 12 is rotated by the spindle motor 12. The optical disk recording apparatus 1 further has an optical head 2 which is provided with a laser light source 25, a collimating lens 24, a beam splitter 28, an objective lens 23, a hologram element 29, a servo detector 26, and a signal detector 27. A laser beam projected from the laser light source 25 is made a substantially parallel optical beam 22 through the collimating lens 24. The optical beam 22 is irradiated on the optical disk 11 through the objective lens 23 to form a spot 21. A portion of the optical beam 22 reflected from the optical disk 11 is guided to the servo detector 26 and to the signal detector 27 through the beam splitter 28, the hologram element 29 and the like.

Signals from the respective detectors are subjected to a subtraction process to be servo signals such as a tracking error signal and a focus error signal, and the servo signals are input to the servo circuit 3. The servo circuit 3 controls the positions of an objective lens actuator 31 and the entire optical head 2 via an automatic position controller 4 based on the obtained tracking error signal and the focus error signal, and places the position of an optical spot 21 in a target recording/reproduction area. An additional signal of the signal detector 27 is input to a signal reproduction block 5. The input signal is subjected to processes of filtering, frequency equalization, and then digitization by the signal processing circuit 52. The digitized digital signal is processed by an address detection circuit 54 and a demodulation circuit 56. A microprocessor 6 calculates the position of the optical spot 21 on the optical disk based on the address signal detected by the address detection circuit 54, and places the optical head 2 and the optical spot 21 in a target recording unit area (sector) by controlling the automatic position controller 4.

When an instruction from a higher-level device to the microprocessor (controller) 6 is a recording, the microprocessor 6 receives the recorded data from the higher-level device and stores the data in a memory 7, while placing the optical spot 21 in a target recording area on the optical disk 11 by controlling the automatic position controller 4. The microprocessor 6 confirms that the optical spot 21 is normally placed in the target recording area by the address signal from the signal reproduction block 5, and then records the data within the memory 7 to the target memory area on the optical disk 11 by controlling a laser driver 8 and other related equipment.

Figure 4:
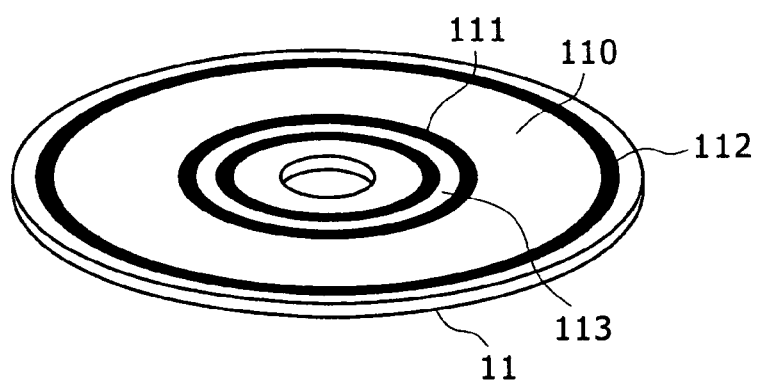
FIG. 4 is a perspective view of an optical disk which shows a recording area and a control area of the optical disk.

FIG. 4 schematically shows the recording area of the optical disk 11. A user data area 110 is defined between an innermost circumference 111 and an outermost circumference 112.

A control data area 113 is provided in a lead-in area further inside from the user area on the inner circumference side. In the control data area 113 there are recorded such parameters as the recording linear velocity, recording power and recording pulse width for the innermost circumference 111 and outermost circumference 112 of the user data area 110. Further, in the control data area 113 there are also recorded the disk type, disk size, recording density, address information of the recording area and the like, in addition to the above described information on the linear velocity.

The optical disk 11 is inserted into the optical disk recording apparatus 1. Then, under the control of the microprocessor 6, the apparatus 1 reads the medium control information (control data) previously stored in the control data area 113 on the optical disk 11. The optical disk recording apparatus 1 extracts from the control data the recording parameters, such as, the recording linear velocity, recording power and recording pulse width of the optical disk 11, and creates a recording parameter table in the memory 7. The apparatus 1 controls the rotation speed of the optical disk 11 based on the extracted recording linear velocity to perform test writing on the innermost circumference 111 and outermost circumference 112 of the optical disk 11.

Further, under the control of the microprocessor 6, the optical disk recording apparatus 1 reproduces the area where the test writing has been performed, checks the quality of the recording signal based on the reproduction signal from the signal reproduction block 5, calculates the optimum linear velocity and recording power, and then corrects the recording parameter table created in the memory 7. FIG. 5 shows an example of the recording parameter table where the recording parameters associated with the corrected linear velocity are described. RBP represents the relative byte position. The linear velocity is defined in RBP=0, where, for example, the linear velocities at the innermost circumference 111 and the outermost circumference 112 of an optical disk 11, shown in FIG. 4, are described. The recording power is defined in RBP=1, where, for example, the recording powers at the innermost circumference 111 and the outermost circumference 112 are described. The pulse edge position (front edge) is defined in RBP=2, where, for example, the pulse edge position information of the front edges at the innermost circumference 111 and the outermost circumference 112 are described. The pulse edge position (rear edge) is defined in RBP=3, where, for example, the pulse edge position information of the rear edges at the innermost circumference 111 and the outermost circumference 112 is described.

Figure 7:
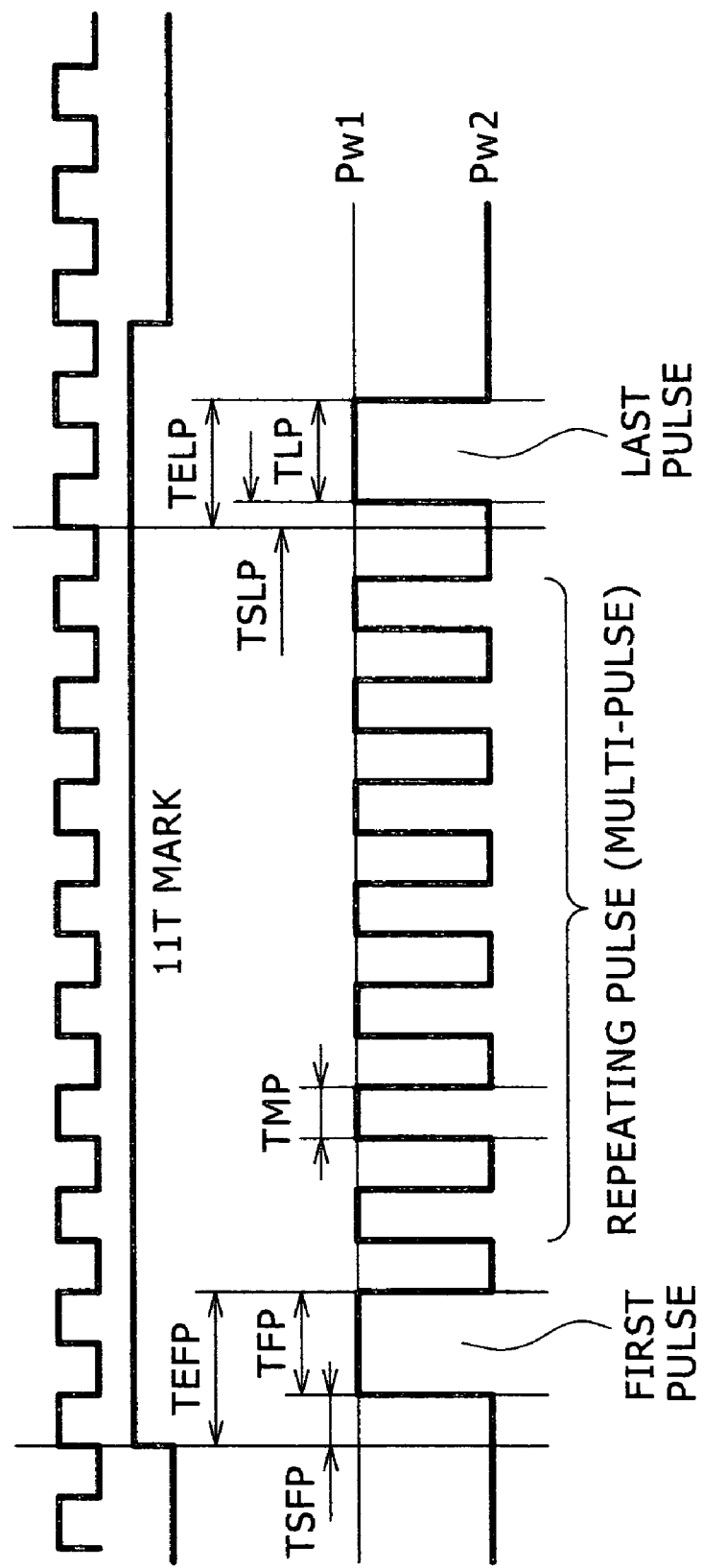
FIG. 7 is a diagram of the recording waveform of an optical disk (DVD-RAM) according to an embodiment of the invention.

FIG. 7 shows a diagram of a write strategy, one of the recording parameters of the DVD-RAM which is a type of the rewritable optical disk. The write strategy is shown for a recording of 11T mark, where T is a recording clock period. As shown in FIG. 7, the write strategy of the DVD-RAM includes a first pulse that is defined by TSFP, TEFP and TFP, a repeating pulse (also referred to as a multi-pulse) that is defined by TMP, and a last pulse that is defined by TSLP, TELP and TLP. Incidentally, there are two laser power levels, one having 2 values and the other having 3 values, and in this example there is shown the laser power level having 2 values, PW1 and PW2.

Figure 1:
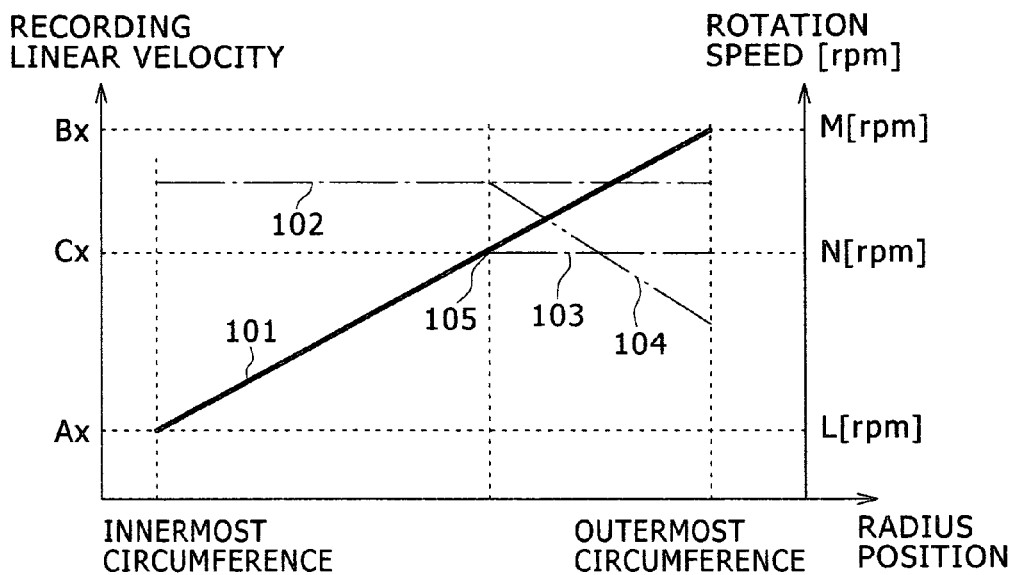
FIG. 1 is a diagram for illustrating a recording control method according to an embodiment of the invention, which shows the relation of the disk radius position, the recording linear velocity, and the disk rotation speed.

Next, the recording control method in the embodiment will be described with reference to FIGS. 1 and 2. In FIG. 1, the horizontal axis represents the disk radius position, the left vertical axis represents the recording linear velocity, and the right vertical axis represents the disk rotation speed. Reference numeral 101 in FIG. 1 denotes the relation between the disk radius position and the recording linear velocity (hereinafter referred to as the profile) when performing recording in the CAV mode from the innermost circumference 111 of the optical disk 11 toward the outermost circumference 112 thereof. In this example, the linear velocity at the innermost circumference 111 of the optical disk 11 is represented by Ax, and the linear velocity at the outermost circumference 112 thereof is represented by Bx. Reference numeral 102 denotes the relation between the disk radius position and the disk rotation speed. The rotation speed from the innermost circumference toward 111 the outermost circumference 112 of the optical disk 11 is kept constant.

Now, assuming that the rotation speed 102 of the optical disk 11 is changed in the PCAV system where the rotation speed becomes as shown by reference numeral 104, due to such factors as the degradation of recording quality and the instability of servo, during the actual recording process performed under the recording conditions described in the recording parameter table shown in FIG. 5. In other words, this is the case where recording in the CAV mode is changed to recording in the CLV mode due to the detection of the degradation of recording quality or the instability of servo. Along with the change to the PCAV system, the recording linear velocity relative to the radius position of the optical disk 11 is changed from that represented by 101 to that represented by a broken line 103 shown in FIG. 1. The recording linear velocity at the change point (broken point) 105 at this time is represented by Cx. Incidentally, the degradation of recording quality can be detected by monitoring the reduction of the reproduction signal amplitude and the asymmetry of the waveform in a signal processing circuit 52. The instability of servo can be detected by monitoring the tracking error signal and the focus error signal in the servo circuit 3.

Figure 2:
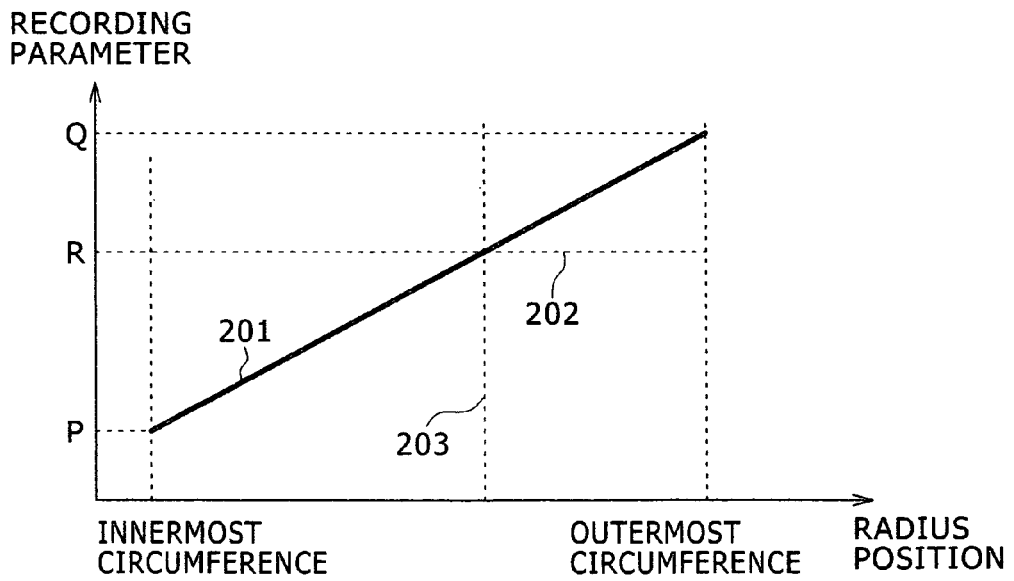
FIG. 2 is a diagram for illustrating a recording control method according to an embodiment of the invention, which shows the relation between the disk radius position and the recording parameter.

FIG. 2 shows the relation between the disk radius position and the recording parameter. Recording parameter P at the innermost circumference 111 and recording parameter Q at the outermost circumference 112 are the values corrected by the test writing described above. Recording parameter R at the broken point 105 is calculated by a linear interpolation based on the recording parameters P and Q. In the case where the recording system of the optical disk 11 is changed from the CAV mode to the CLV mode in the PCAV system as shown in FIG. 1, it is necessary to restructure the recording parameter table as shown in FIG. 5. In accordance with an embodiment, the recording parameter is quickly restructured to perform recording in the PCAV system from the current recording parameter information, rather than performing again and learning, such as, the test writing upon the restructuring of the recording parameter table.

The following is the processing sequence of the microprocessor 6 for reconstructing the recording parameter table.

(1) Interrupt the recording process.

(2) Calculate the linear velocity Cx at the broken point 105 where the recording linear velocity shown in FIG. 1 becomes constant. The radius position of the broken point 105 has been calculated based on the address information from the address detection circuit 54, so that the linear velocity Cx can be calculated by a linear interpolation based on the linear velocity Ax at the innermost circumference 111 and the linear velocity Bx at the outermost circumference 112 of the optical disk 11.

(3) Calculate the recording parameter R in the linear velocity Cx by a linear interpolation 201 based on the recording parameters P and Q shown in FIG. 2, replacing all the recording parameters for the outer circumference side 202 from a radius position 203 where the linear velocity becomes Cx, with the recording parameter R. The reconstructed recording parameter table is shown in FIG. 6.

(4) Resume the recording with the recording parameter R as the recording condition.

The above described recording parameter R is the parameter at the point of time when the recording quality begins to degrade or the servo becomes unstable. Because the disk rotation speed becomes reduced from this point of time, the recording quality and the stability of servo can be assured. Incidentally, it may also be possible to calculate the recording parameter corresponding to the linear velocity slightly lower than the linear velocity Cx at the broken point 105 by the linear interpolation 201 to set it as a recording parameter for the restructuring.

According to the embodiment of the invention as described above, in an optical disk recording apparatus for creating a recording parameter table by performing recording parameter learning, such as, test writing at two or more radius positions, when a change in the velocity profile occurs during recording, it is possible to restructure the recording parameter table in response to the change in the velocity profile without relearning the recording parameters, so that the record interruption time can be reduced.

It should be noted that in the above described embodiment, the linear interpolation is employed for the derivation of the recording parameter at the disk radius position; however the invention is not limited to this method and any other suitable methods may be used. In addition, the embodiment has been described for the case where the relation between the recording parameter learning speeds Ax, Bx and the broken point speed Cx is given by Ax<Cx<Bx. However, with the relation given by Ax<Bx<Cx or Cx<Ax<Bx, it is also possible to calculate the recording parameter by the method such as an extrapolation based on the linear interpolation.

In addition, to simply the description in the above embodiment, the description has been given taking the example of applying the CAV system. However, it is also possible to apply a ZCAV (Zoned CAV) system that divides the disk into several zones in the radius direction with the disk rotation speed kept constant, where the bit rates within the zones are the same respectively and the linear velocity is the maximum at the outermost circumference. Similarly, in the event of a change in the PCAV system at the broken point, it is possible to apply a ZCLV (Zoned CLV) system where the rotation speeds are constant within each of the zones but are different among the zones.

What is claimed is:

1. A recording control method for an optical disk recording apparatus for recording data by irradiating a laser beam on an optical disk in one of a constant angular velocity (CAV) mode and a constant linear velocity (CLV) mode, the method comprising:

reproducing control data from a control data area of the optical disk, and extracting recording parameters from the control data to create a recording parameter table;

performing test writing at two or more radius positions of the optical disk, based on the recording parameters extracted from the control data, to correct the recording parameters in the recording parameter table;

performing recording data, in the CAV mode, from an inner circumference of the optical disk toward an outer circumference thereof based on corrected recording parameters in the recording parameter table;

interrupting the recording, during an interrupting period, when a change from the CAV mode to the CLV mode occurs during the recording in the CAV mode, and calculating a recording linear velocity at a point of change from the CAV mode to the CLV mode;

calculating a recording parameter corresponding to the calculated linear velocity based on the corrected recording parameters in the recording parameter table during the interrupting period;

replacing the corrected recording parameters in the recording parameter table for the outer circumference of the optical disk from a radius position at the point of the change, with the calculated recording parameter during the interrupting period; and resuming recording data, in the CLV mode, based on the replaced recording parameter.

2. The recording control method according to claim 1, wherein the change from the CAV mode to the CLV mode in the optical disk recording apparatus occurs in association with a change in a rotation of the optical disk from the CAV mode to the CLV mode in the optical disk recording apparatus.

3. The recording control method according to claim 1, wherein the calculated recording parameter includes at least the recording linear velocity, a recording power, and a recording pulse width of a pulse of the laser beam that forms a mark on the optical disk.

4. The recording control method according to claim 1, wherein the change from the CAV mode to the CLV mode in the optical disk recording apparatus is at the point of time when degradation of a recording quality is detected in the recording operation.

5. The recording control method according to claim 1, wherein the change from the CAV mode to the CLV mode in the optical disk recording apparatus is at the point of time when instability of a servo is detected in the recording operation.

6. The recording control method according to claim 1, wherein the recording parameter corresponding to the recording linear velocity is calculated at the point of the change by a linear interpolation between the corrected recording parameters at an innermost circumference and at an outermost circumference of the optical disk.

7. An optical disk recording apparatus comprising:

a motor arranged to drive and rotate an optical disk at one of a constant angular velocity (CAV) and a constant linear velocity (CLV);

an optical head arranged to record data by irradiating a laser beam onto the optical disk, and to detect a reflected light from the optical disk to generate a servo signal and a reproduction signal;

a servo circuit, responsive to the servo signal from the optical head, to control a position of the optical head relative to the optical disk;

a signal reproduction unit, responsive to the reproduction signal, to generate demodulated data and an address signal; and a controller, responsive to outputs of the signal reproduction unit, to control operation of the motor, the optical head, the servo circuit and the signal reproduction unit, including:

reproducing control data from a control data area of the optical disk to create a recording parameter table including recording parameters obtained from the control data;

performing test writing at two or more radius positions of the optical disk to correct the recording parameters in the recording parameter table;

performing recording data, at the constant angular velocity (CAV), from an inner circumference of the optical disk toward an outer circumference thereof based on the corrected recording parameters in the recording parameter table;

interrupting the recording, during an interrupting period, when a change from the constant angular velocity (CAV) to the constant linear velocity (CLV) occurs during the recording at the constant angular velocity (CAV) to calculate a linear velocity at a point of change;

calculating a recording parameter corresponding to the calculated linear velocity based on the corrected recording parameters in the recording parameter table during the interrupting period;

replacing the corrected recording parameters in the recording parameter table for the outer circumference from a radius position at the point of change with the calculated recording parameter during the interrupting period; and resuming recording data, at the constant linear velocity (CLV), based on the replaced recording parameter.

8. The optical disk recording apparatus according to claim 7, wherein the change from the CAV to the CLV occurs in association with a change in a rotation of the optical disk from the CAV to the CLV.

9. The optical disk recording apparatus according to claim 7, wherein the calculated recording parameter includes at least the recording linear velocity, a recording power, and a recording pulse width of a pulse of the laser beam that forms a mark on the optical disk.

10. The optical disk recording apparatus according to claim 7, wherein the change from the CAV to the CLV is at the point of time when degradation of a recording quality is detected in the recording operation.

11. The optical disk recording apparatus according to claim 7, wherein the change from the CAV to CLV is at the point of time when instability of servo is detected in the recording operation.

12. The optical disk recording apparatus according to claim 7, wherein the recording parameter corresponding to the linear velocity at the point of the change is calculated by a linear interpolation between the corrected recording parameters at an innermost circumference and at an outermost circumference of the optical disk.

13. A method for updating recording parameters in an optical disk recording apparatus during recording data on an optical disk driven at one of a constant angular velocity (CAV) and a constant linear velocity (CLV), the method comprising:

determining whether a change in a drive method occurs for driving the optical disk from the constant angular velocity (CAV) to the constant linear velocity (CLV) during the recording of data on the optical disk driven at the constant angular velocity (CAV);

interrupting the recording of data on the optical disk driven at the constant angular velocity (CAV), during an interrupting period, when the change in the drive method occurs for driving the optical disk from the constant angular velocity (CAV) and the constant linear velocity (CLV) during the recording, calculating a recording linear velocity at a point of change from the constant angular velocity (CAV) to the constant linear velocity (CLV) and recording parameters corresponding to the calculated linear velocity based on recording parameters previously stored in a memory, and updating the recording parameters previously stored in the memory with calculated recording parameters during the interrupting period; and resuming the recording of data on the optical disk driven in the constant linear velocity (CLV) based on updated recording parameters stored in the memory.

14. The method according to claim 13, wherein the change from the constant angular velocity (CAV) to the constant linear velocity (CLV) in the optical disk recording apparatus occurs at a point on the optical disk when a recording quality is degraded.

15. The method according to claim 13, wherein the calculated recording parameters include at least the recording linear velocity, a recording power, and a recording pulse width of a pulse of a laser beam that forms a mark representing data on the optical disk.

16. The method according to claim 13, wherein the change from the constant angular velocity (CAV) to the constant linear velocity (CLV) in the optical disk recording apparatus occurs at a point on the optical disk when a servo is unstable during the recording.

17. The method according to claim 13, wherein the recording parameters corresponding to the recording linear velocity are calculated at a point of the change by a linear interpolation between the previous recording parameters stored in the memory at an innermost circumference and at an outermost circumference of the optical disk.

* * * * *